United States Patent [19]
Ropertz

[11] Patent Number: 5,950,586
[45] Date of Patent: Sep. 14, 1999

[54] AIR CONDUCTION SYSTEM FOR A VEHICLE

[75] Inventor: Peter Ropertz, Markgroningen, Germany

[73] Assignee: Robert Bosch GmbH, Stuttgart, Germany

[21] Appl. No.: 09/029,385

[22] PCT Filed: Dec. 20, 1996

[86] PCT No.: PCT/DE96/02497

§ 371 Date: Feb. 27, 1998

§ 102(e) Date: Feb. 27, 1998

[87] PCT Pub. No.: WO98/00638

PCT Pub. Date: Jan. 8, 1998

[30] Foreign Application Priority Data

Jun. 29, 1996 [DE] Germany ............................ 196 26 251

[51] Int. Cl.[6] .................................................. F02M 35/10
[52] U.S. Cl. .................. 123/184.42; 123/184.21
[58] Field of Search .................. 123/184.53, 184.21, 123/184.38, 184.42, 184.57

[56] References Cited

U.S. PATENT DOCUMENTS

| | | | |
|---|---|---|---|
| 4,183,332 | 1/1980 | Hofbauer et al. ................... | 123/184.42 |
| 5,088,454 | 2/1992 | Washizu et al. ..................... | 123/184.53 |
| 5,259,356 | 11/1993 | Karlsson et al. .................... | 123/184.21 |
| 5,477,819 | 12/1995 | Kopec ................................ | 123/184.42 |
| 5,537,965 | 7/1996 | Topfer et al. ....................... | 123/184.42 |
| 5,575,247 | 11/1996 | Nakayama et al. ................. | 123/184.21 |
| 5,630,387 | 5/1997 | Kamiyama .......................... | 123/184.38 |
| 5,664,533 | 9/1997 | Nakayama et al. ................. | 123/184.42 |
| 5,718,195 | 2/1998 | Oshuga et al. ...................... | 123/184.53 |

*Primary Examiner*—Noah P. Kamen
*Assistant Examiner*—Jason Benton
*Attorney, Agent, or Firm*—Edwin E. Greigg; Ronald E. Greigg

[57] ABSTRACT

An air duct system of an internal combustion engine comprising various components disposed at various points in the engine compartment of the motor vehicle. The air duct system includes a gas guide chamber that leads through the air duct system via a course such that only a small total installation space is needed. Part of the air duct system is curved, and the curved region has another part of the gas guide chamber that passes through it. The air duct system is intended in particular for an internal combustion engine of a motor vehicle.

20 Claims, 8 Drawing Sheets

AIR CONDUCTION SYSTEM FOR A VEHICLE

The air duct system is intended in particular for a motor vehicle. In previously known air duct systems, the various components of the air duct system are secured at various points of the body of the motor vehicle. In one known air duct system, for instance, a gas guide chamber leads from an air inlet opening of the air duct system to an air filter secured for instance to the wheelwell of the motor vehicle body. From the air filter, the gas guide chamber then leads on, for instance to a throttle device with a throttle valve pivotably supported in it. Downstream of the throttle device, the gas guide chamber splits into a plurality of conduits leading to cylinders. The number of conduits is equivalent to the number of cylinders of the engine.

A disadvantage of the known air duct system is that it needs a large amount of space overall in the motor vehicle engine compartment, so that less space is then available for other motor vehicle equipment in the engine compartment. Alternatively, because only a certain amount of installation space is made available to the air duct system, the air duct system or the useful internal volume of the gas guide chamber of the air duct system cannot be made as large as would be needed for optimal functions of the air duct system. Hence compromises must be made, which do not always lead to an outcome that is satisfactory in every respective.

In addition, the known air duct system involves major effort and expense for installation in the engine compartment of the motor vehicle.

ADVANTAGES OF THE INVENTION

The air duct system according to the invention has the advantage over the prior art that while having a large internal useful volume, the air duct system overall requires only little installation space. In the air duct system, the available installation space is advantageously utilized especially well.

Mounting the air duct system on the engine, or its installation in the motor vehicle, is additionally and advantageously especially simple and requires little mounting effort or expense.

By means of the provisions recited herein, advantageous further features of and improvements to the air duct system recited are possible.

If a spirally shaped curved region is located downstream of the interpenetrating region, in terms of the direction of the air flowing through the air duct system, then the available installation space can advantageously be utilized especially.

If the spirally shaped curved region is located upstream of the outlet opening of the air duct system, then an especially favorable guidance of the air is advantageously achieved.

If the interpenetrating region is located downstream of the air inlet opening by a relatively short distance, then still further improvement is obtained in the utilization of the available installation space.

In the course between the air inlet opening and the outlet opening, an air filter may be provided, and the effort and expense and requisite installation space for this air filter are advantageously especially slight.

The region between the interpenetrating region and the spirally shaped curved region is advantageously especially suitable for the provision of the air filter.

In the region between the air inlet opening and the outlet opening of the air duct system, a throttle device can advantageously be provided without major effort or expense.

If the engine has two or more cylinders, and if the gas guide chamber is therefore split into two or more conduits in the region upstream of the outlet opening of the air duct system, for instance, and the interpenetrating region is passed between the at least two conduits, then an especially expedient utilization of the available installation space is advantageously obtained. Unutilized regions are largely avoided in the available installation space for the air duct system.

If at least part of the cylinder head hood is used to form at least a portion of the gas guide chamber, then advantageously only a few components in all are needed, and the available installation space can be utilized especially well. The mounting effort and expense when the air duct system is installed on the engine are especially low.

If the cylinder head hood is used to hold or carry the air filter, then advantageously a still further reduction in the requisite mounting effort and expense is obtained, and the number of components required is advantageously especially low.

If a design cap is provided, at least part of which forms a portion of the gas guide chamber, then a visually attractive appearance of the air duct system is obtained, and in addition only a few components in all are needed, and the available installation space is utilized especially well.

BRIEF DESCRIPTION OF THE DRAWING

Especially selected and especially advantageous exemplary embodiments of the invention are shown in simplified form in the drawing and described in further detail in the ensuing description.

DESCRIPTION OF THE EXEMPLARY EMBODIMENTS

The air duct system embodied according to the invention may be provided in various internal combustion engines. The engine is for instance a motor to which air or a fuel-air mixture is delivered via the air duct system. The air duct system can be combined structurally with various components required for operating the engine.

The engine is an aspirating engine, for instance, in which air is aspirated by suitable motion of the pistons. However, it is also possible to provide an additional unit that delivers the air under pressure to the engine.

The engine preferably has multiple cylinders, but it may in principle be an internal combustion engine with only a single cylinder.

Although the engine may be of various types and can be used to drive different machines, for the sake of simplicity in the ensuing description of the exemplary embodiments it is assumed that the engine operates by the principle of an Otto engine, is an aspirating engine, is installed in the engine compartment of a motor vehicle, and is used to drive the motor vehicle. It is also assumed that the engine includes four in-line cylinders, with the line of four cylinders being installed crosswise to the travel direction of the motor vehicle.

Figure 1:
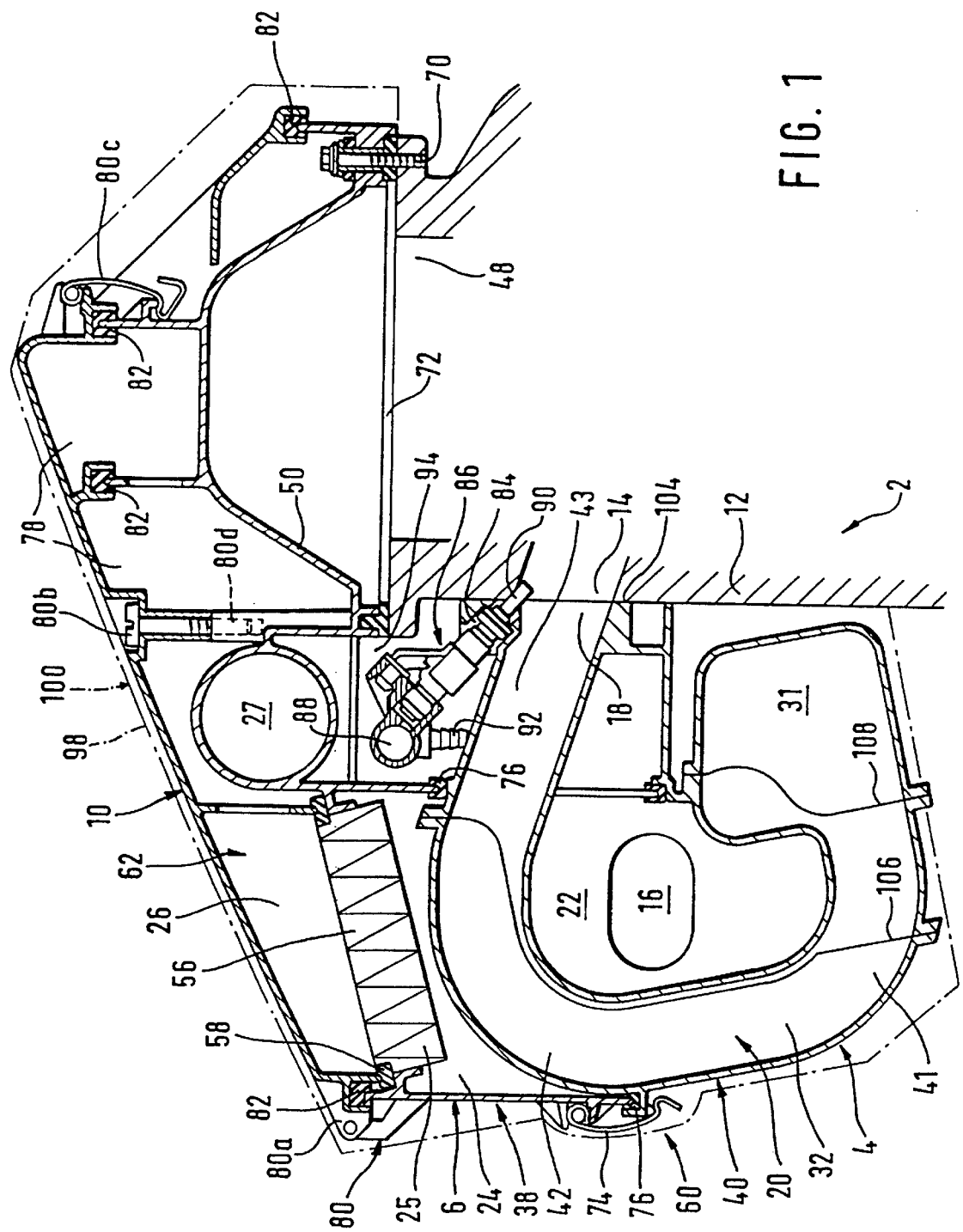
FIGS. 1–8 show various sections and views of air duct systems selected as examples.

FIG. 1 shows a cross section through the air duct system. The sectional plane shown extends longitudinally to the travel direction of the motor vehicle.

Figure 2:
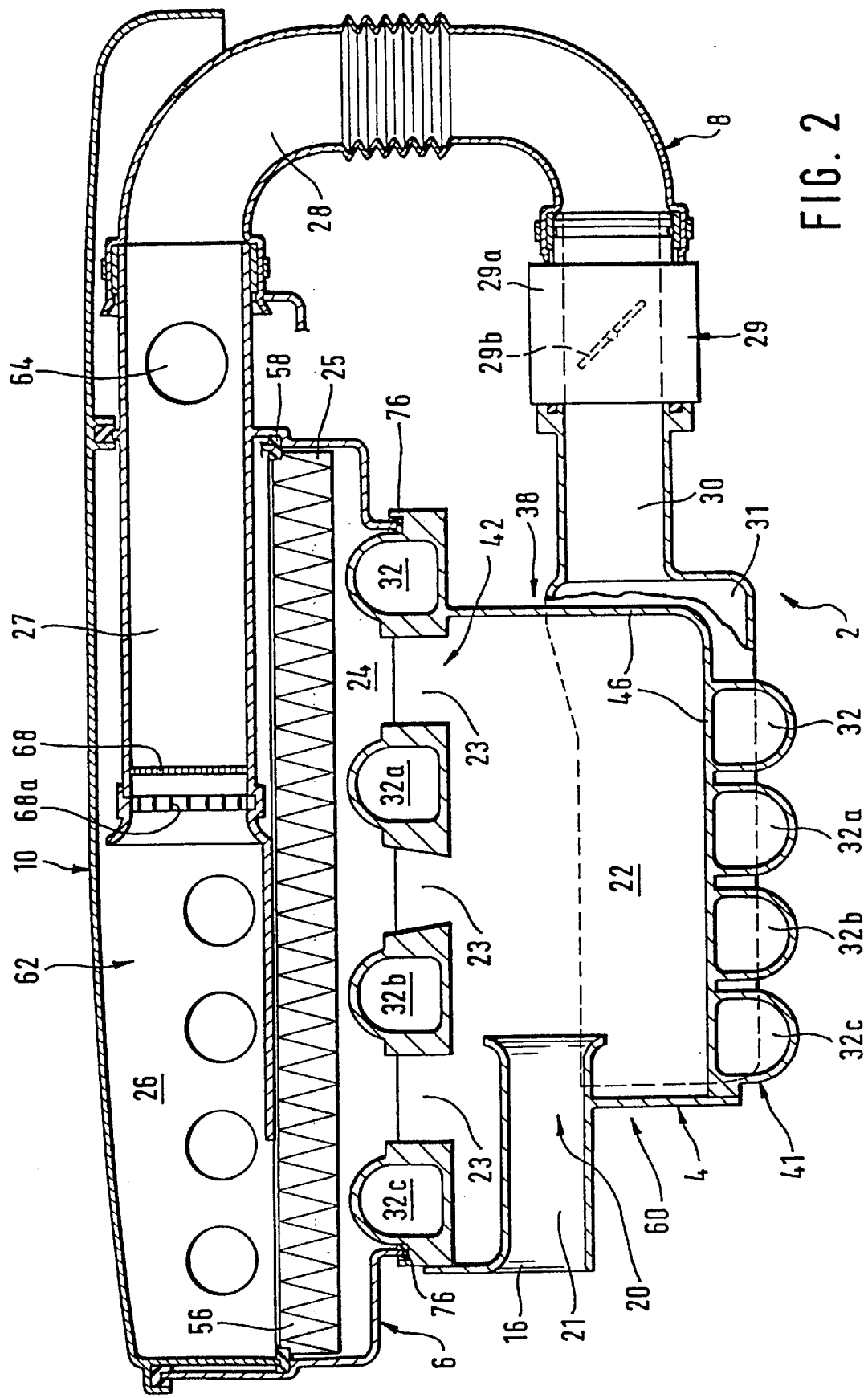

FIG. 2 shows a longitudinal section through the air duct system; the sectional plane of FIG. 2 extends at right angles to the sectional plane shown in FIG. 1, or in other words extends crosswise to the travel direction.

For the sake of better comprehension, the sectional faces shown in FIGS. 1 and 2 do not each extend in a single plane but instead are graduated multiple times, to make the essence of the invention as clear as possible.

Figure 3:
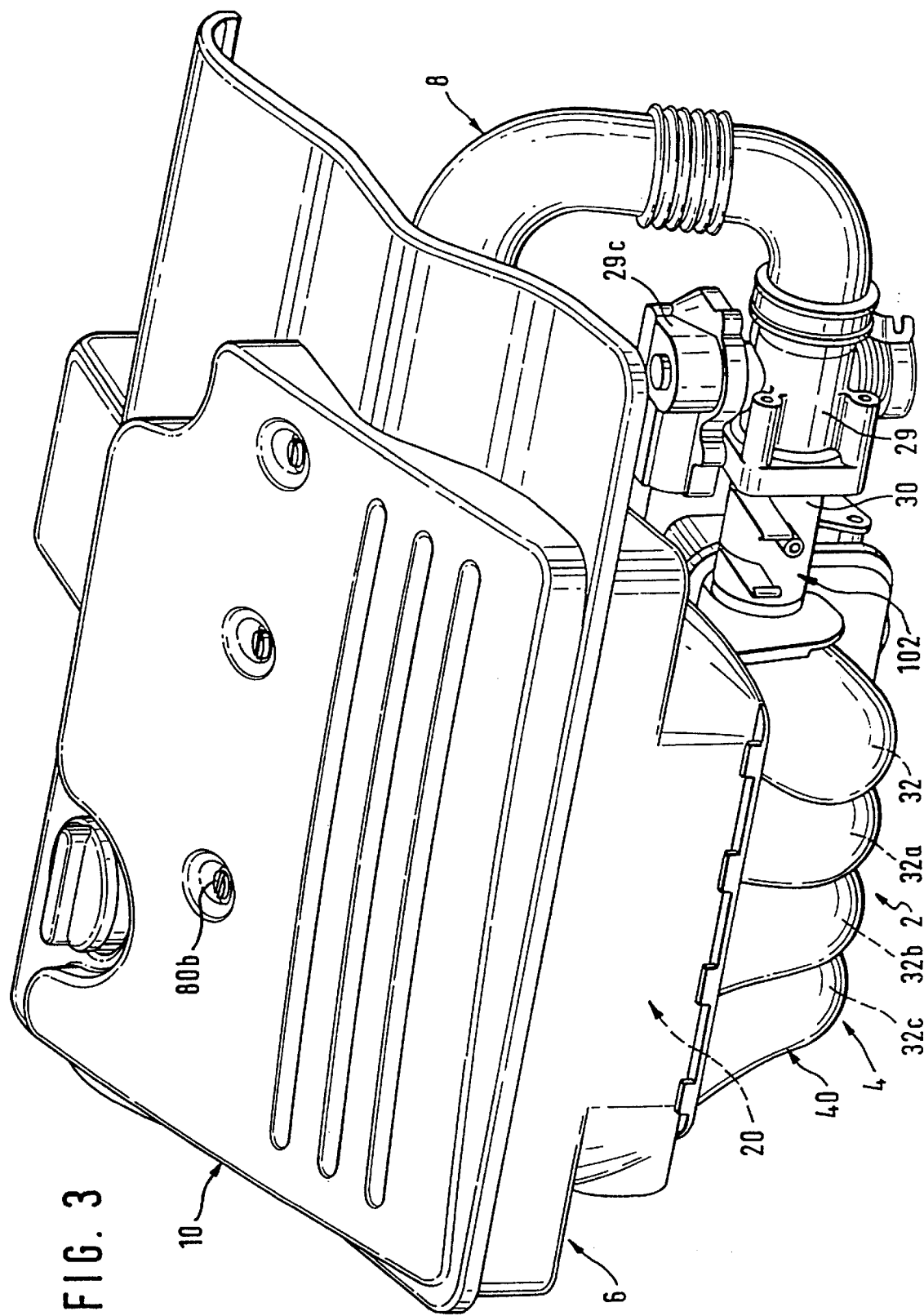

FIG. 3 is a view on the air duct system obliquely from the front, somewhat above the air duct system.

In all the drawing figures, elements that are the same or function the same are provided with the same reference numerals. Unless otherwise mentioned or shown in the drawing, what is said about and shown in one of the figures applies to all the exemplary embodiments. Unless otherwise stated in the explanations, the details of the various exemplary embodiments can be combined with one another.

The exemplary embodiment of the air duct system 2 selected as the preferred embodiment for the description and the drawing is composed essentially of a first air duct part 4, a second air duct part 6, a tube 8, and a design hood 10. In approximate terms, the first air duct part 4, second air duct part 6, tube 8 and design hood 10 are the primary components of the air duct system 2.

Figure 4:
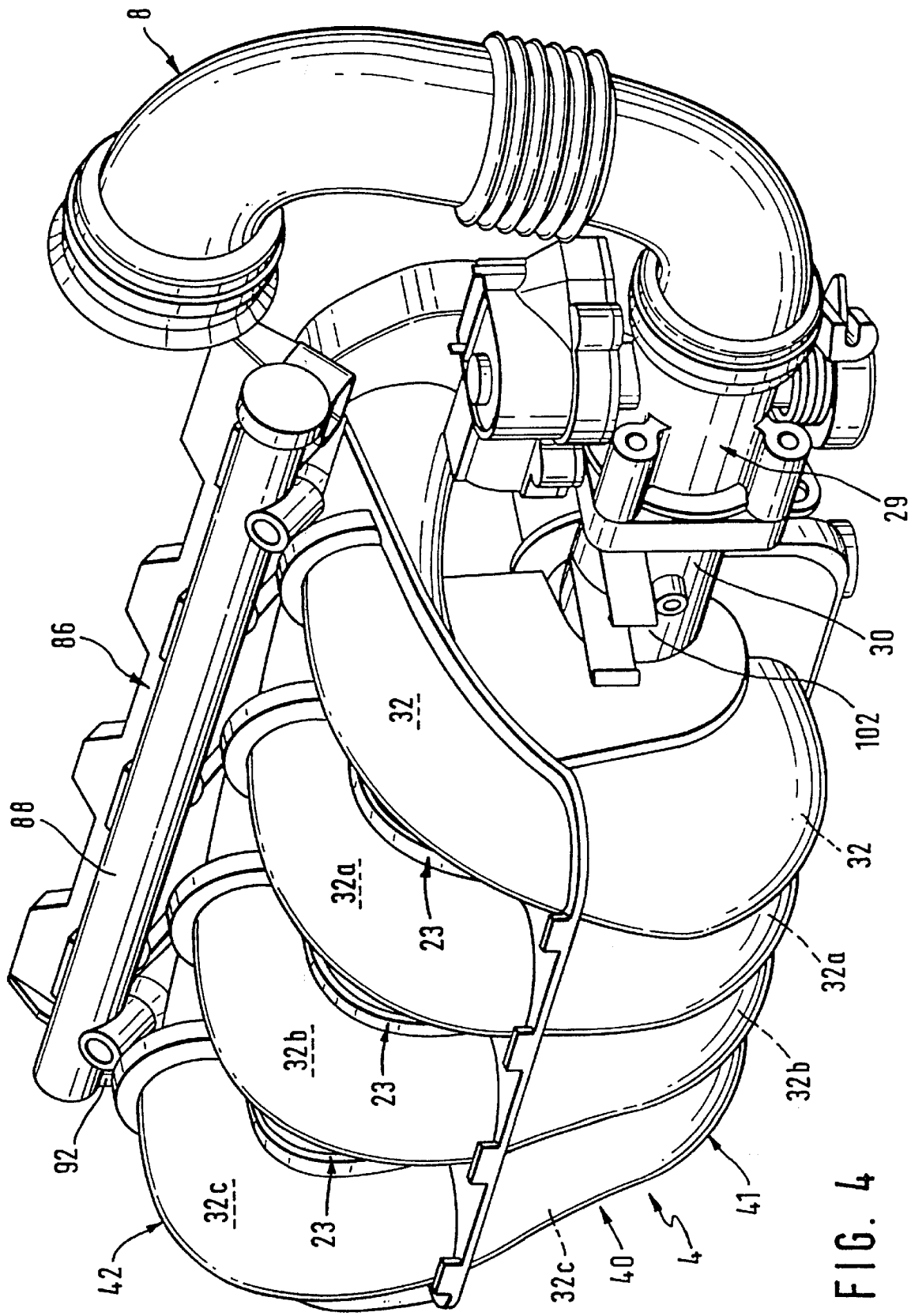

FIG. 4 shows a portion of the air duct system 2. FIG. 4 essentially shows the first air duct part 4 and the tube 8. For the sake of better comprehension, the second air duct part 6 and the design hood 10 are not shown in FIG. 4.

Figure 5:
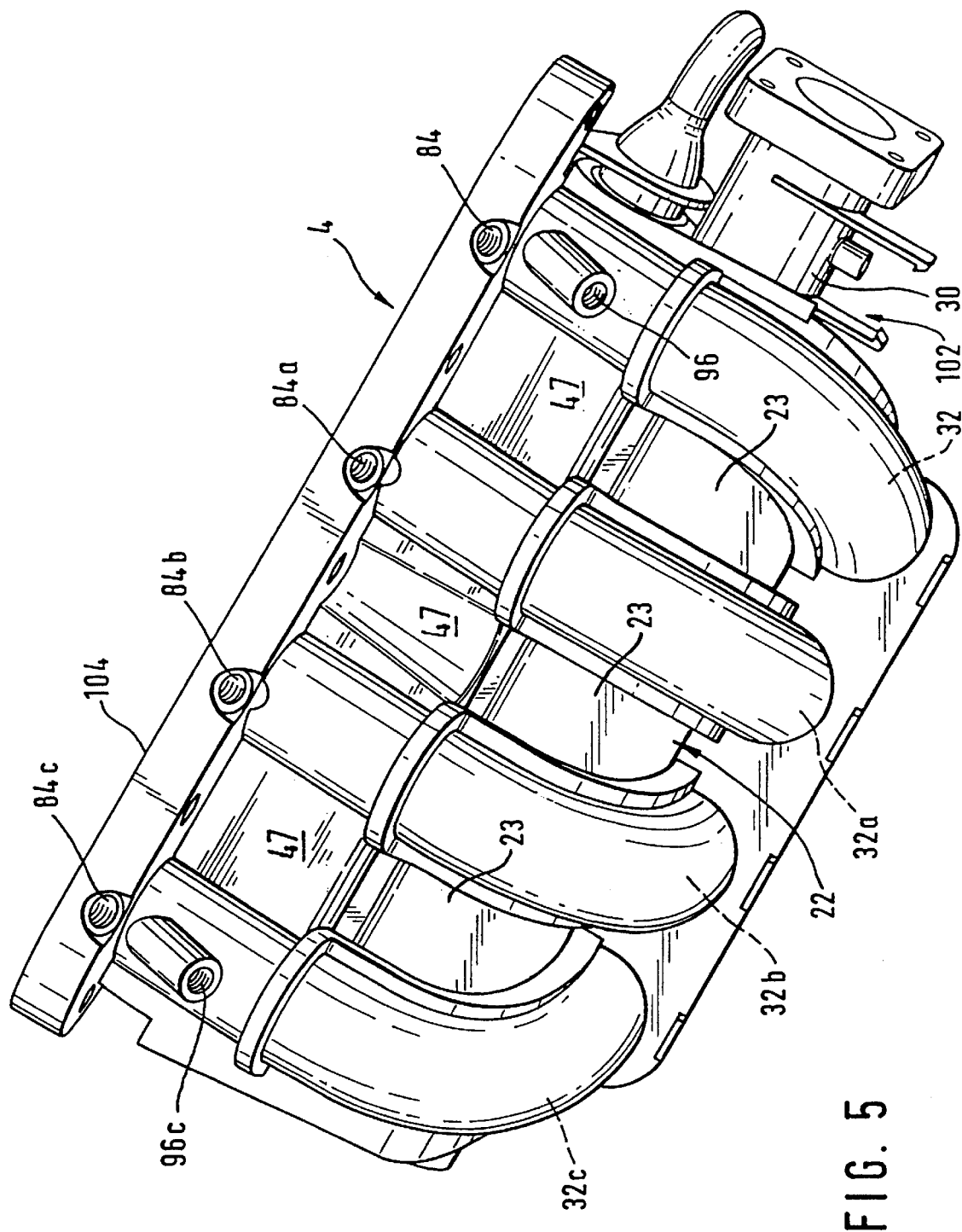
Figure 6:
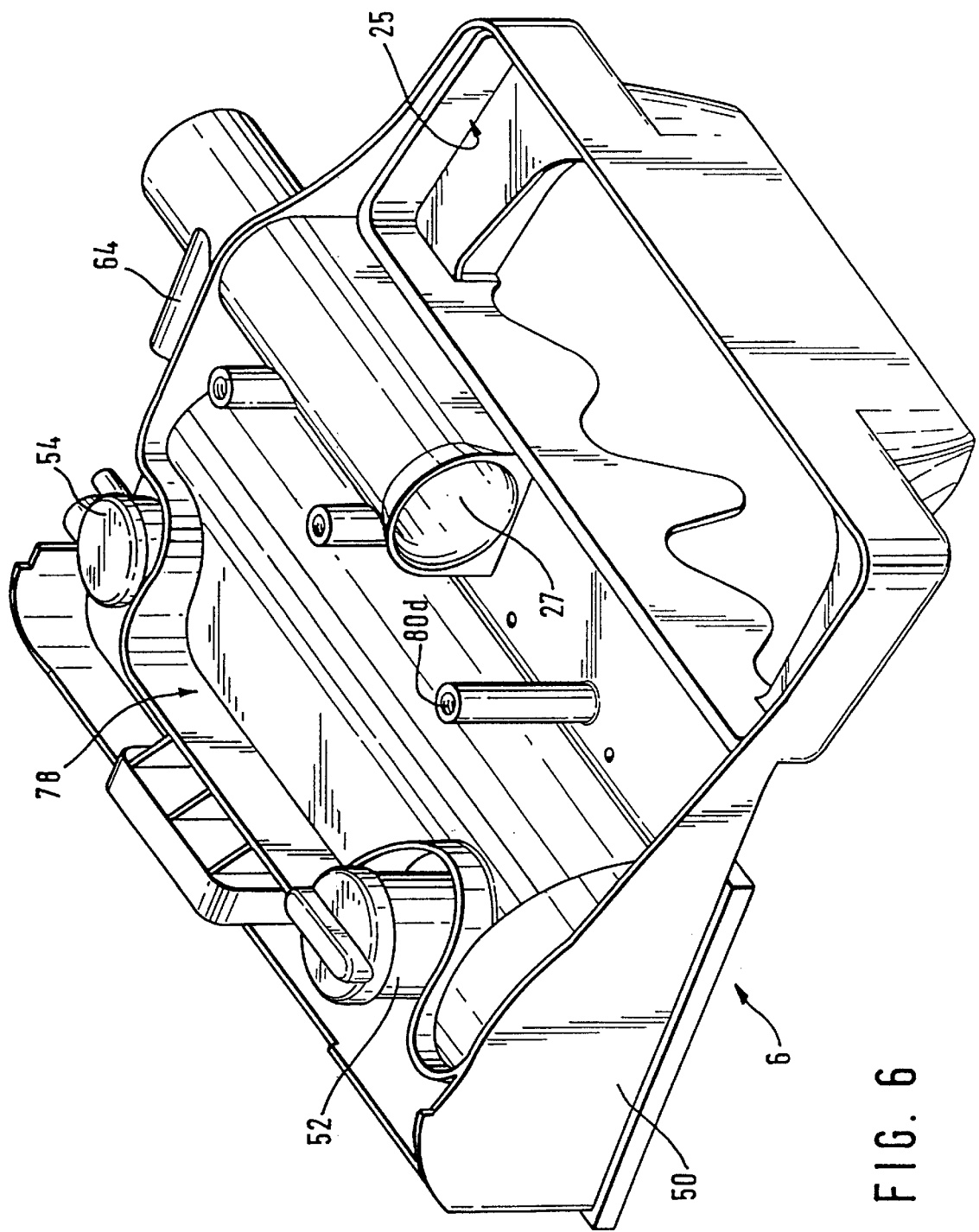

FIG. 5 shows a further view from a different direction of the first air duct part 4. FIG. 6 essentially shows the second air duct part 6 in an oblique view from above.

Figure 7:
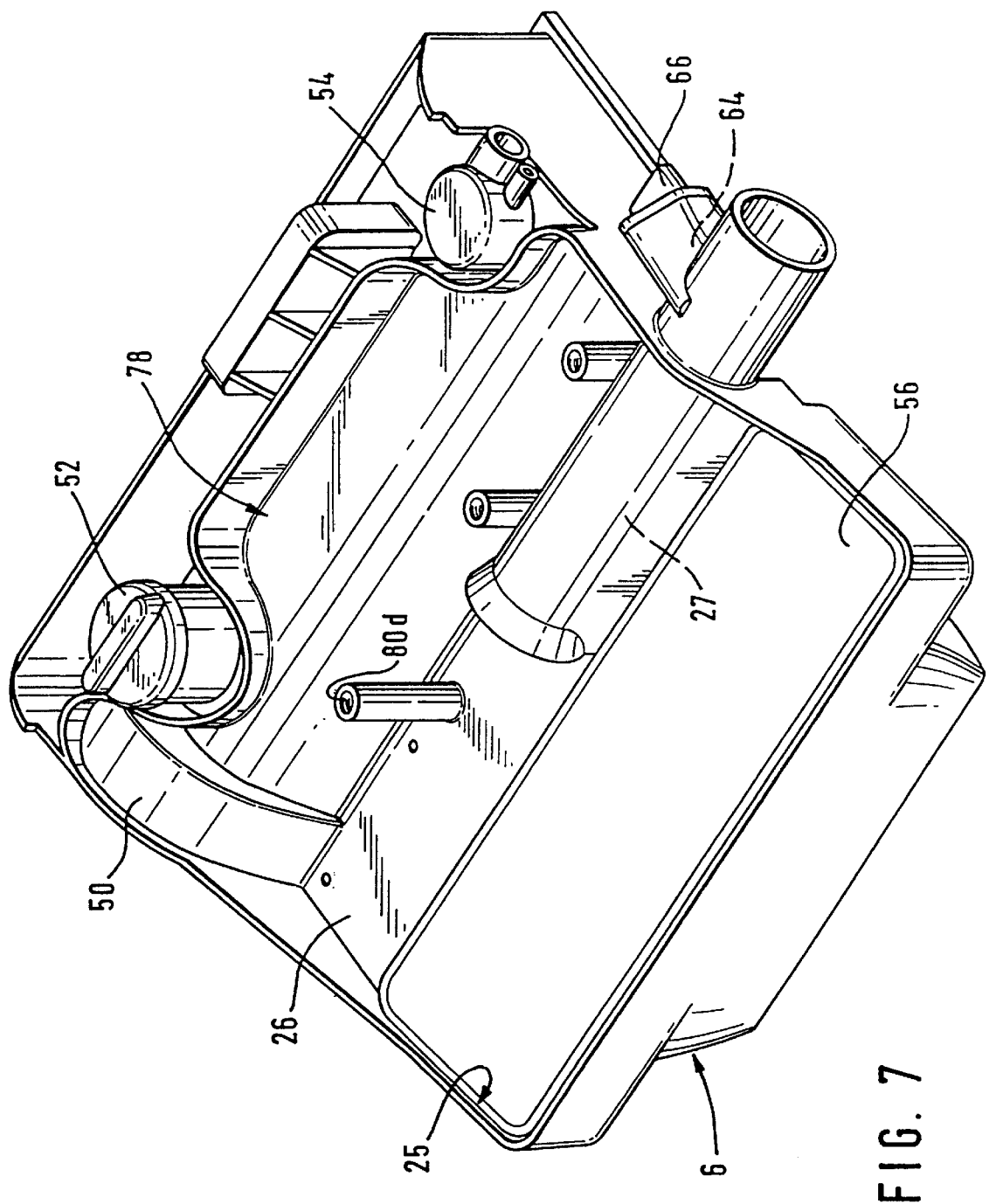

FIG. 7 is again a view of the second air duct part 6 from a direction different from FIG. 6.

In the ensuing description, the drawing figure (FIG.) that especially clearly shows the particular detail is repeatedly given in parentheses.

The selected internal combustion engine has four cylinders and a cylinder head 12. A small portion of a section through the cylinder head 12 of the engine is shown (FIG. 1). For the sake of better comprehension, essentially only the outlines of the section through the cylinder head 12 are shown.

The cylinder head 12 belongs to an engine having at least one cylinder. In the cylinder, there is a displaceably supported piston (not shown, for the sake of simplicity) and a combustion chamber (also not shown, for the sake of simplicity). A gas inlet opening 14 leads into the engine combustion chamber. Through the gas inlet opening 14, air or a fuel-air mixture can reach the combustion chamber.

The air duct system 2 has an air inlet opening 16 (FIGS. 1, 2) and an outlet opening 18 (FIG. 1). A gas guide tube leads through the air duct system 2. The gas guide tube will hereinafter be called the gas guide chamber 20. The gas guide chamber 20 begins at the air inlet opening 16 and leads via the outlet opening 18 into the gas inlet opening 14 of the cylinder head 12 of the engine.

Through the gas guide chamber 20, air can flow through the air inlet opening 16 and reach the engine combustion chamber. In the course of the air duct system 2, the air flowing through it can be supplied with fuel or a mixture, depending on the engine type and as needed.

To simplify the explanation of the exemplary embodiments, the gas guide chamber 20 will be thought of below as being subdivided into a plurality of parts. In this imaginary subdivision, the gas guide chamber 20, beginning at the air inlet opening 16, has an inlet conduit 21 (first part 21 of the gas guide chamber 20) (FIG. 2). The inlet conduit 21 is followed downstream by a fresh air chamber or air chamber 22 (second part 22 of the gas guide chamber 20) (FIGS. 1, 2). In terms of the flow direction, the air chamber 22 is divided into three fresh air conduits 23 (third part 23 of the gas guide chamber 20) (FIG. 2). The fresh air conduits 23 are united again in a prefilter chamber 24 (fourth part 24 of the gas guide chamber 20). The prefilter chamber 24 is located upstream of a filter installation space 25 (fifth part 25) of the gas guide chamber 20). Following is the filter installation space 25 is a postfilter chamber 26 (sixth part 26 of the gas guide chamber 20) (FIGS. 1, 2). Following the postfilter chamber 26, in terms of the flow direction, is a calming conduit 27 (seventh part 27 of the gas guide chamber 20) (FIGS. 1, 2, 6). The calming conduit 27 is followed by a connecting conduit 28 (eighth part 28 of the gas guide chamber 20) (FIG. 2). The connecting conduit 28 is located substantially inside the flexible tube 8. The connecting conduit 28 ends downstream in a throttle device 29 (ninth part 29 of the gas guide chamber 20) (FIGS. 2, 3). This is followed downstream by a connecting stub 30 (tenth part 30 of the gas guide chamber 20) (FIG. 2). The connecting stub 30 discharges into a gas distribution chamber 31 (eleventh part 31 of the gas guide chamber 20) (FIGS. 1, 2). A conduit 32 (twelfth part 32 of the gas guide chamber 20) branches off from the gas distribution chamber 31 (FIGS. 1, 2, 3).

The conduit 32 carries the medium, or some of it, flowing through the air duct system 2 from the gas distribution chamber 31 through the outlet opening 18 and the gas inlet opening 14 to the combustion chamber of the engine.

Since the air duct system 2 selected as the preferred embodiment is intended for instance for an internal combustion engine with four combustion chambers, three further conduits 32a, 32b, 32c (FIGS. 2, 5) branch off, parallel to the conduit 32, from the gas distribution chamber 31; each of these conduits 32, 32a, 32b, 32c leads to a respective combustion chamber of the four-cylinder engine.

The inlet conduit 21, the air chamber 22, the fresh air conduit 23, and part of the prefilter chamber 24 belong to a tubular region of the air duct system 2 that will hereinafter be called the interpenetrating region 38. The air duct system 2 can also be embodied in such a way that some of these components are located outside the interpenetrating region 38.

In terms of the longitudinal direction of the gas distribution chamber 31, the conduits 32, 32a, 32b, 32c branch off virtually at a right angle from the gas distribution chamber 31. The conduits 32, 32a, 32b, 32c form a spirally shaped curved region 40 (FIG. 1) of the air duct system 2. In approximate terms, the curved region 40 can be imagined as comprising a first portion 41, a second portion 42 and a third portion 43.

The first portion 41 begins, in terms of the flow direction, at the point where the conduits 32, 32a, 32b, 32c branch off from the gas distribution chamber 31. In the first portion 41, the conduits 32, 32a, 32b, 32c communicate with one another via a wall 46 (FIG. 2). The first portion 41 of the conduits 32, 32a, 32b, 32c (FIG. 2) is located on the outward-facing side of the wall 46, and the air chamber 22 is located on the inward-facing side of the wall 46. The wall 46 partitions the air chamber 22 off from the environment, and the wall 46 also serves to partition off the conduits 32, 32a, 32b, 32c from the air chamber 22. In the first portion 41, the conduits 32, 32a, 32b, 32c extend in a curve (a clockwise curve of approximately 90° in terms of the viewing direction of FIG. 1). The curve is followed by a short straight piece. The end of the first portion 41 can be imagined as placed at the end of the straight piece.

The second portion 42 of the curved region 40 adjoins the first portion 41. The conduits 32, 32a, 32b, 32c are extended in a further curve (clockwise curve of approximately 120°, for instance, in terms of the view of FIG. 1) in the second portion 42. In the second portion 42, the conduits 32, 32a, 32b, 32c are spaced apart from one another, so that there are gaps between the conduits 32, 32a, 32b, 32c that serve to connect the air chamber 22 of the fresh-air conduit 23 with the prefilter chamber 24 (FIGS. 2, 5). The air can flow out of the air chamber 22 through the conduits 32, 32a, 32b, 32c in the direction of the prefilter chamber 24.

In the exemplary embodiment shown in the drawing, there are three gaps in the conduits 32, 32a, 32b, 32c. Through these three gaps, the fresh-air conduit 23 (FIG. 3) leads out of the air chamber 22 into the prefilter chamber 24. Since the engine selected as an example has four cylinders, the three gaps result between the conduits 32, 32a, 32b, 32c, and therefore the freshair conduit 23 is divided up into three regions that carry the air parallel. The fresh-air conduit 23 makes optimal use of the gaps between the conduits 32, 32a, 32b, 32c, so that no unusable room is wasted between the conduits 32, 32a, 32b, 32c.

The third portion 43 (FIG. 1) then comes, adjoining the second portion 42. In the third portion 43, the conduits 32, 32a, 32b, 32c are then substantially straight until each of the conduits 32, 32a, 32b, 32c end at a respective outlet opening 18. A wall 47 (FIG. 5) inserted between the conduits 32, 32a, 32b, 32c and the third portion 43 partitions off the air chamber 22 from the environment.

The conduits 32, 32a, 32b, 32c are curved spirally. By way of example, the conduits 32, 32a, 32b, 32c are curved by a total of 180° in the three portions 41, 42, 43. As FIG. 1 shows, the conduits 32, 32a, 32b, 32c can in particular also be curved by more than 180°. The so-called spirally shaped curved region 40 at least partially encompasses the interpenetrating region 38.

The conduits 32, 32a, 32b, 32c have a cross section that in its form is approximately equivalent to the cross section, greatly reduced, of a highway tunnel (FIG. 2).

On the cylinder head 12 of the engine, there is a chamber 48 (FIG. 1). Located in the chamber 48 are for instance the typical injection valves and outlet valves for an internal combustion engine and the control shaft for controlling the inlet and outlet valves. The control shaft, inlet and outlet valves are not shown, for the sake of greater simplicity. The chamber 48 (FIG. 1) is covered with the aid of a cylinder head hood 50 (FIGS. 1, 6). An oil fill stub 52 and a connection 54 are formed onto the cylinder head hood 50. Lines leading into the chamber 48 and out of the chamber 48 can be connected to the connection 54.

The cylinder head hood 50 is shaped such that it can be used both to cover the chamber 48 of the cylinder head 12 and for forming the second air duct part 6 of the air duct system 2 (FIG. 6). In other words, the second air duct part 6 is shaped such that it is both a component of the air duct system 2 and can serve to cover the chamber 48 of the engine. The second air duct part 6 shown in FIG. 6, with the cylinder head hood 50 formed onto it, can be made in one piece, cohesively, using an injection mold. The material comprising the second air duct part 6 is preferably plastic.

The second air duct part 6 is shaped such that the filter installation space 25 (FIG. 6) is formed in it. Next to it, the second air duct part 6 also forms the calming conduit 27 (seventh portion of the gas guide chamber 20) (FIGS. 1, 2, 6). An air filter 56 (FIGS. 1, 2, 7) is located in the filter installation space 25. The air filter 56 substantially comprises a filter cartridge that is placed in the filter installation space 25. An encompassing seal 58 (FIGS. 1, 2) is provided on the filter cartridge of the air filter 56. The seal 58 seals off the air filter 56 from the air duct part 6 or the design hood 10 (FIGS. 1, 2), so that no air can escape from the prefilter chamber 24 into the postfilter chamber 26 while bypassing the air filter 56.

Because of the air filter 56, the regions upstream of the air filter 56, which include the inlet conduit 21, the air chamber 22, the fresh-air conduit 23 and the prefilter chamber 24, can be called the fresh-air chamber 60 (FIG. 2). Correspondingly, the regions of the air duct system 2 that are located downstream of the air filter 56 can be called the clean-air chamber 62. The clean-air chamber 62 includes the postfilter chamber 26, the calming conduit 27, the connecting conduit 28, the internal region of the throttle device 29, the connecting stub 30, the gas distribution chamber 31, and the conduits 32, 32a, 32b, 32c.

A connection opening 64 (FIGS. 2, 7) is formed onto the second air duct part 6. The connection opening 64 discharges into the calming conduit 27. A flow rate meter 66 (FIG. 7) is provided in the connection opening 64. The flow rate meter 66 can sense the volume or mass of air flowing through the gas guide chamber 20 per unit of time and furnish an electrical signal accordingly to an electronic system, not shown. In addition to or instead of the flow rate meter 66, a temperature meter that measures the temperature of the air flowing through can be built into the connection opening 64.

Upstream of the flow rate meter 66 in the calming conduit 27, a metal screen 68 (FIG. 2) and/or a flow lattice 68a molded from plastic are provided. The screen 68 and the flow lattice 68a promote the calming of the air approaching the flow rate meter 66.

The second air duct part 6 of the air duct system 2, which also takes on the function of the cylinder head hood 50, is connected to the cylinder head 12 of the engine via one fastening means 70 (FIG. 1) or more than one fastening means 70. The fastening means 70 is in the form of one or more screws, for instance, with which the air duct part 6 is firmly connected to the engine. Between the cylinder head 12 and the air duct part 6, an encompassing cylinder head seal 72 (FIG. 1) is provided, which seals off the chamber 48 from the environment.

The second air duct part 6 is firmly, but releasably as needed, connected to the first air duct part 4 via a fastening means 74 (FIG. 1). The fastening means 74 by way of example includes one or more clamps distributed over the circumference. By way of example, the clamps of the fastening means 74 are pivotably supported on the second air duct part 6 and, after the second air duct part 6 is mounted on the first air duct part 4, can snap into place on corresponding cams provided on the first air duct part 4.

The shapes of the first air duct part 4 and second air duct part 6 are adapted to one another in such a way that a cavity, which is a component of the gas guide chamber 20, is formed between the first air duct part 4 and the second air duct part 6. Located in the cavity by way of example are in particular the prefilter chamber 24 and the filter installation space 25. A housing seal 76 (FIGS. 1, 2) is provided between the first air duct part 4 and the second air duct part 6. The housing seal 76 seals off the gas guide chamber 20 from the environment.

The design hood 10 is mounted on the second air duct part 6. The shapes of the design hood 10 and of the second air duct part 6 are adapted to one another in such a way that a cavity, which is a component of the postfilter chamber 26, is formed between the design hood 10 and the second air duct part 6. This cavity essentially belongs to the clean-air chamber 62. The cavity between the design hood 10 and the second air duct part 6 extends not only in the region directly downstream of the filter 56 but also far into the region located above the cylinder hood 50 that covers the chamber 48. As a result, an additional chamber 78 (FIGS. 1, 7) is created between the design hood 10 and the second air duct part 6. The chamber 78 is located not directly in the flow of air but rather somewhat to the side of it. For the sake of reinforcement and secure holding of the air filter 56, intermediate ribs are provided between the design hood 10 and the air duct part 6. Openings are located in the intermediate ribs, so that the additional chamber 78 communicates directly with the gas guide chamber 20. The additional chamber 78 volumetrically increases the usable volume redundant] of the gas guide chamber 20. This has major influence on the noise produced by the engine. Because the gas guide chamber 20 can be made rather large, even if external space is restricted, the noise production of the air duct system 2 or engine can be reduced substantially.

The design hood 10 is connected firmly, but releasably as needed (FIG. 1), with the second air duct part 6 via a fastening means 80. The fastening means 80 for instance includes one hinge 80a or a plurality of hinges 80a, one screw 80b or a plurality of screws 80b, and one clamp 80c or a plurality of clamps 80c. Depending on the number of screws 80b, the fastening means 80 also includes one nut thread 80d (FIGS. 1, 6), or a plurality of nut threads 80d, formed or cut onto the air duct part 6, for screwing in the screw 80b or screws 80b for securing the design hood 10 to the air duct part 6. After the clamp 80c and screw 80b have been loosened, the design hood 10 can be swiveled relative to the air duct part 6, and the air filter 56 can for instance be checked or replaced.

At points of contact between the design hood 10 and the second air duct part 6, an encompassing seal 82 is provided. The seal 82 is also mounted on the intermediate ribs between the air duct part 6 and the design hood 10.

The cylinder head seal 72, the housing seal 76 between the two air duct parts 4 and 6, and the seal 82 serves the purpose of sealing off and acoustically uncoupling the various components and thus have a noise-abating effect.

In the air duct system 2, a fuel delivery opening 84 (FIGS. 1, 5) is provided. As the preferred selected exemplary embodiment shows, the fuel delivery opening 84 extends in the region of the outlet opening 18 into the gas guide chamber 20. Depending on the number of conduits 32, 32a, 32b, 32c, a corresponding number of fuel delivery openings 84, 84a, 84b, 84c (FIG. 5) is provided.

A fuel distributor strip 86 (FIG. 1) is mounted onto the air duct system 2. The fuel distributor strip 86 includes a fuel tube 88, an electrically actuatable injection valve 90 (FIG. 1), and a fuel connection stub 92. One injection valve 90 (FIG. 1) is inserted into each of the fuel delivery openings 84, 84a, 84b, 84c (FIG. 5).

Each of these four injection valves 90 branches off from the fuel tube 88. For the sake of simplicity, only one of the injection valves 90 is shown in FIG. 1. Via a fuel pump, not shown, the fuel passes via the fuel connection stub 92 to reach the fuel tube 88. Via the fuel tube 88, the injection valves 90, for instance the four such injection valves, are supplied with fuel and the injection valves 90 inject the fuel, controlled by a control unit, in metered fashion via the gas inlet opening 14 into the engine combustion chamber. In the region of the gas inlet opening 14, intensive mixing of the fuel with the aid delivered to the engine via the air duct system 2 takes place.

Between the first air duct part 4 and the second air duct part 6, a cavity 94 extending along the four cylinders, for instance, of the engine is formed. The fuel distributor strip 86 having the injection valves 90 can be disposed in this cavity 94. The fuel distributor strip 86 is thus protected against damage and, since it is not visible from above, a largely smooth-surfaced and therefore visually attractive appearance of the air duct system 2 is achieved. Since the fastening means 70 and 74 are designed such that the air duct part 6 with the design hood 10 can easily be removed, the fuel distributor strip 86 is easily accessible as needed.

There are two fastening threads 96 and 96c (FIG. 5) on the first air duct part 4. The fastening threads 96, 96c are provided so that the fuel distributor strip 86 with the injection valves 90 can be connected firmly but releasably to the air duct part 4 via fastening screws. The fastening screws are not shown, for the sake of simplicity.

In FIG. 1, a dot-dashed line 98 that gas multiple angle bends is shown. The dot-dashed line 98 on the one hand and the cylinder head 12 of the engine on the other define an installation space 100. The air duct system 2 is located inside the installation space 100. In many motor vehicles, the space that can be made available or is furnished for the air duct system 2 is relatively narrowly bounded. As the drawing shows, the air duct system 2 embodied according to the invention makes very good use of the available installation space 100. The air duct system 2 is designed such that despite the relatively small installation space 100, the internal usable volume of the gas guide chamber 20 of the air duct system 2 is relatively large. Because of the large volume of the gas guide chamber 20, there are favorable effects in terms of noise abatement and in terms of the degree to which the engine combustion compartments are filled. Because the usable volume of the gas guide chamber 20 can be made relatively large, there is also a relatively large amount of space available for the air filter 56, so that a relatively large air filter cartridge can be built into the air duct system 2, which has the advantage that the length of the time that the air filter 56 can be used before the filter cartridge of the air filter 56 can to be replaced is long. The particularly good utilization of the available installation space 100 is also due to the fact that the air duct system 2 has the spirally shaped curved region 40 and the interpenetrating region 38 that at least partly penetrates the spirally shaped curved region 40 and essentially includes the air chamber 22 and the fresh-air conduit 23.

The tube 8 is connected by its upstream end to the calming conduit 27 (FIG. 2) formed onto the air duct part 6, and downstream the tube 8 is connected to the throttle device 29. The throttle device 29 is mechanically coupled to the first air duct part 4. Via the elastic housing seal 76, the two air duct parts 4 and 6 are largely decoupled from one another vibrationally and acoustically. The tube 8 is elastic and therefore does not, or not substantially, hinder the vibrational decoupling between the two air duct parts 4 and 6. By way of example, the throttle device 29 includes a throttle valve 29b (FIG. 2) pivotably supported in a throttle valve stub 29a. The position of the throttle valve 29b is variable, for instance with the aid of an electrically controllable positioner 29c (FIG. 3). The throttle device 29 that includes the throttle valve stub 29a, throttle valve 29b and positioner 29c can be flanged as a complete unit to the first air duct part 4 of the air duct system 2. The positioner 29c of the throttle device 29 for instance includes an electrically triggerable electric motor and/or an actuating lever that can be mechanically adjusted from a gas pedal, for instance via a Bowden cable.

A retaining device 102 (FIGS. 3, 5) is provided on the preferred exemplary air duct system 2 shown. Via the retaining device 102, a tank venting valve can for instance be secured to the air duct system 2. The retaining device 102 is for instance formed onto the connecting stub 30 of the first air duct part 4.

Taken together, the air duct system 2 forms a functional unit for an internal combustion engine and can therefore also be called an air guide module. The engine is often an engine that aspirates air at negative pressure. The air duct system 2 can therefore also be called an air guide module or aspiration system or aspiration module.

The air duct system 2 or air guide module or aspiration system or aspiration module can for instance be assembled, complete, at a first production facility and then installed in the engine at a second production facility. However, it is also possible to furnish the air duct system 2 in two separate, individual modules to the second production facility and not to put them together until when they are mounted onto the engine. The first individual module (FIG. 4) for instance substantially includes the first air duct part 4, the tube 8, the throttle device 29, and the fuel distributor strip 86 that has the injection valves 90 and is mounted on the first air duct part 4. FIG. 4 shows the components of the first individual module. A flange face 104 (FIGS. 1, 5) is provided on the first air duct part 4. A counterpart flange face is located on the engine. The first air duct part 4 can be secured with its flange face 104 to the counterpart flange face of the engine. Fastening means, especially screws, not shown in the drawing are used for this fastening. The second individual module for instance substantially includes the second air duct part 6 with the cylinder head hood 50 formed onto it, the air filter 56 inserted into the air duct part, the flow rate meter 66, the oil fill stub 52, and the design hood 10. However, the design good 10 can also be mounted onto the engine later, independently of the second individual module.

In the exemplary embodiment shown, the four injection valves 90 are provided so as to meter fuel separately to each cylinder of the engine. It will be noted, however, that the air duct system 2 may also be embodied such that fuel is delivered to some other point of the air duct system 2. For instance, it is possible for fuel to be injected into the gas guide chamber 20 in the region of the throttle device 29, in which case the fuel mixes intensively with the air in the region of the throttle device 29 and is delivered together with the air to the engine combustion chambers. In addition it is also possible for the fuel to be injected, via injection valves not shown, not into the air duct system 2 but rather directly into the engine combustion chambers.

In the first air duct part 4, there is a first parting plane 106 and a second parting plane 108 (FIG. 1), both curving back and forth. For easy production of the air duct part 4 by casting, the air duct part 4 is made of three cast or injection-molded individual parts, which are welded or glued together after the casting or injection molding. Since the first air duct part 4, like the second air duct part 6, is preferably of plastic, it is easily possible to weld or glue the three individual parts together.

Figure 8:
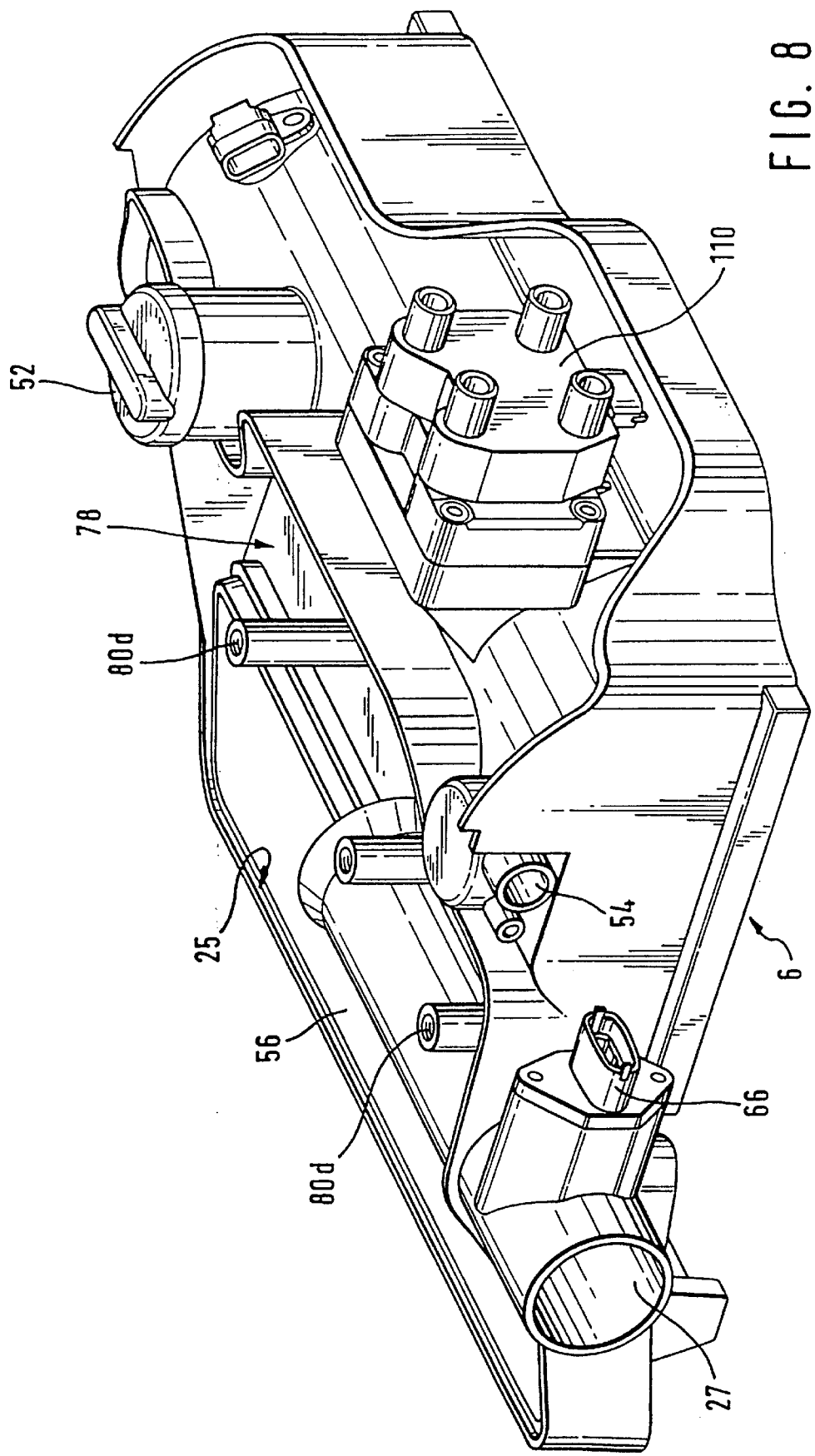

FIG. 8 shows a modified, preferably selected exemplary embodiment.

As in FIG. 6, FIG. 8 shows a view of the second air duct part 6, but from a different direction. In addition, in the exemplary embodiment shown in FIG. 8, an ignition device 110 is mounted firmly on the air duct part 6. By way of example, the ignition device 110 includes four ignition coils, and one spark plug, not shown, can be connected to each of the four ignition coils. The ignition device 110 is preferably of a design in which an ignition distributor can be dispensed with. The ignition device 110 serves to ignite the fuel-air mixture in the combustion chambers of the engine.

The foregoing relates to preferred exemplary embodiments of the invention, it being understood that other variants and embodiments thereof are possible within the spirit and scope of the invention, the latter being defined by the appended claims.

I claim:

1. An air duct system, for an internal combustion engine comprising at least two combustion chambers with at least one gas inlet opening leading into the combustion chamber, an air inlet opening (16), having an outlet opening (18) connected to the gas inlet opening of the combustion chamber, a gas guide chamber (20) which carries air from the air inlet opening (16) to the outlet opening (18), the gas guide chamber (20) has at least one spirally shaped curved region (40) which is divided into at least two conduits (32, 32a, 32b, 32c) and one interpenetrating region (38) that is made to at least partly penetrate the spirally shaped curved region (40) and to pass at least partly between the at least two conduits.

2. An air duct system in accordance with claim 1, in which the spirally shaped curved region (40) is located downstream of the interpenetrating region (38).

3. An air duct system in accordance with claim 1, in which the spirally shaped curved region (40) adjoins the outlet opening (18) upstream thereof.

4. An air duct system in accordance with claim 2, in which the spirally shaped curved region (40) adjoins the outlet opening (18) upstream thereof.

5. An air duct system in accordance with claim 1, in which the interpenetrating region (38) adjoins the air inlet opening (16) downstream thereof.

6. An air duct system in accordance with claim 1, in which an air filter (56) is provided between the air inlet opening (16) and the outlet opening (18).

7. An air duct system in accordance with claim 6, in which the air filter (56) is provided between the interpenetrating region (38) and the spirally shaped curved region (40).

8. An air duct system in accordance with claim 1, in which a throttle device (29) is provided between the air inlet opening (16) and outlet opening (18).

9. An air duct system in accordance with claim 8, in which the throttle device (29) is provided between the interpenetrating region (38) and the spirally shaped curved region (40).

10. An air duct system in accordance with claim 8, in which the throttle device (29) is provided downstream of the air filter (56).

11. An air duct system in accordance with claim 9, in which the throttle device (29) is provided downstream of the air filter (56).

12. An air duct system in accordance with claim 1, in which an intermediate tube (8) connects the interpenetrating region (38) with the spirally shaped curved region (40).

13. An air duct system in accordance with claim 1, in which the engine has a chamber (48) closed off with the aid of a cylinder head hood (50), and at least part of the cylinder head hood (50) forms at least one portion of the gas guide chamber (20).

14. An air duct system in accordance with claim 6, in which the air filter (56) is carried by the cylinder head hood (50).

15. An air duct system in accordance with claim 7, in which the air filter (56) is carried by the cylinder head hood (50).

16. An air duct system in accordance with claim 6, in which the cylinder head hood (50) is intended to carry an ignition device (11).

17. An air duct system in accordance with claim 7, in which the cylinder head hood (50) is intended to carry an ignition device (11).

18. An air duct system in accordance with claim 1, in which a design hood (10) at least partially covering the engine is provided, and at least part of the design hood (10) surrounds at least a portion of the gas guide chamber (20).

19. An air duct system in accordance with claim 2, in which a design hood (10) at least partially covering the engine is provided, and at least part of the design hood (10) surrounds at least a portion of the gas guide chamber (20).

20. An air duct system in accordance with claim 3, in which a design hood (10) at least partially covering the engine is provided, and at least part of the design hood (10) surrounds at least a portion of the gas guide chamber (20).

* * * * *